United States Patent [19]
Hart

[11] Patent Number: 5,410,739

[45] Date of Patent: Apr. 25, 1995

[54] VARIABLE DATA MESSAGE COMMUNICATION OVER VOICE COMMUNICATION CHANNEL

[75] Inventor: Robert H. Hart, San Diego, Calif.

[73] Assignee: The Titan Corporation, San Diego, Calif.

[21] Appl. No.: 954,279

[22] Filed: Sep. 29, 1992

[51] Int. Cl.⁶ .................... H04B 7/26; H04B 1/48; H04Q 7/32; G08G 1/123

[52] U.S. Cl. .................... 455/66; 455/54.1; 455/89; 455/345; 340/539; 340/573; 340/996

[58] Field of Search .......... 455/66, 67.1, 54.1, 455/54.2, 58.1, 38.2, 70, 89, 90, 79, 84, 344, 345, 346, 78; 340/825.48, 825.45, 825.49, 573, 539, 996

[56] References Cited

U.S. PATENT DOCUMENTS

| | | | |
|---|---|---|---|
| 4,009,342 | 2/1977 | Fahrenschon et al. | 179/2 |
| 4,367,374 | 1/1983 | Serrano | 179/2 |
| 4,488,003 | 12/1984 | Nishimura | 179/2 |
| 4,517,561 | 5/1985 | Burke et al. | 455/58.1 |
| 4,578,537 | 3/1986 | Faggin et al. | 179/2 |
| 4,660,218 | 4/1987 | Hashimoto | 379/93 |
| 4,665,385 | 5/1987 | Henderson | 340/573 |
| 4,821,312 | 4/1989 | Horton et al. | 379/102 |
| 4,833,477 | 5/1989 | Tendler | 340/996 |
| 4,922,524 | 5/1990 | Baba et al. | 379/100 |
| 4,952,928 | 8/1990 | Carroll | 340/539 |
| 5,003,581 | 4/1991 | Pittard | 379/93 |
| 5,023,903 | 6/1991 | Bowen | 379/67 |
| 5,029,234 | 7/1991 | Kawai | 455/54.1 |
| 5,170,490 | 12/1992 | Cannon et al. | 455/84 |
| 5,173,795 | 12/1992 | Branan | 455/89 |

Primary Examiner—Edward F. Urban
Assistant Examiner—Mark D. Wisler
Attorney, Agent, or Firm—Edward W. Callan

[57] ABSTRACT

An apparatus that causes variable data messages to be transmitted automatically following transmission of voice signals over a given communication channel. The apparatus includes a microprocessor for processing variable data to generate a variable data message, and is adapted to be coupled between a radio interface circuit and a microphone handset having a momentary push-to-talk switch in such a manner so as to be transparent during transmission of voice signals while the momentary PTT switch is being actuated. The microprocessor detects deactuation of the PTT switch and responds thereto by providing the variable data message to the radio for transmission. A GPS navigational computer and receiver processes received variable GPS position data to determine the position of the vehicle in which the apparatus is located, and generates a variable position data message component. The microprocessor processes physiological condition data representative of one or more monitored physiological conditions of a person located in common with the apparatus, such as a pilot in an airplane having a two-way radio, and generates a variable physiological status data message component indicative of a given physiological status, such as stress, of said person.

9 Claims, 2 Drawing Sheets

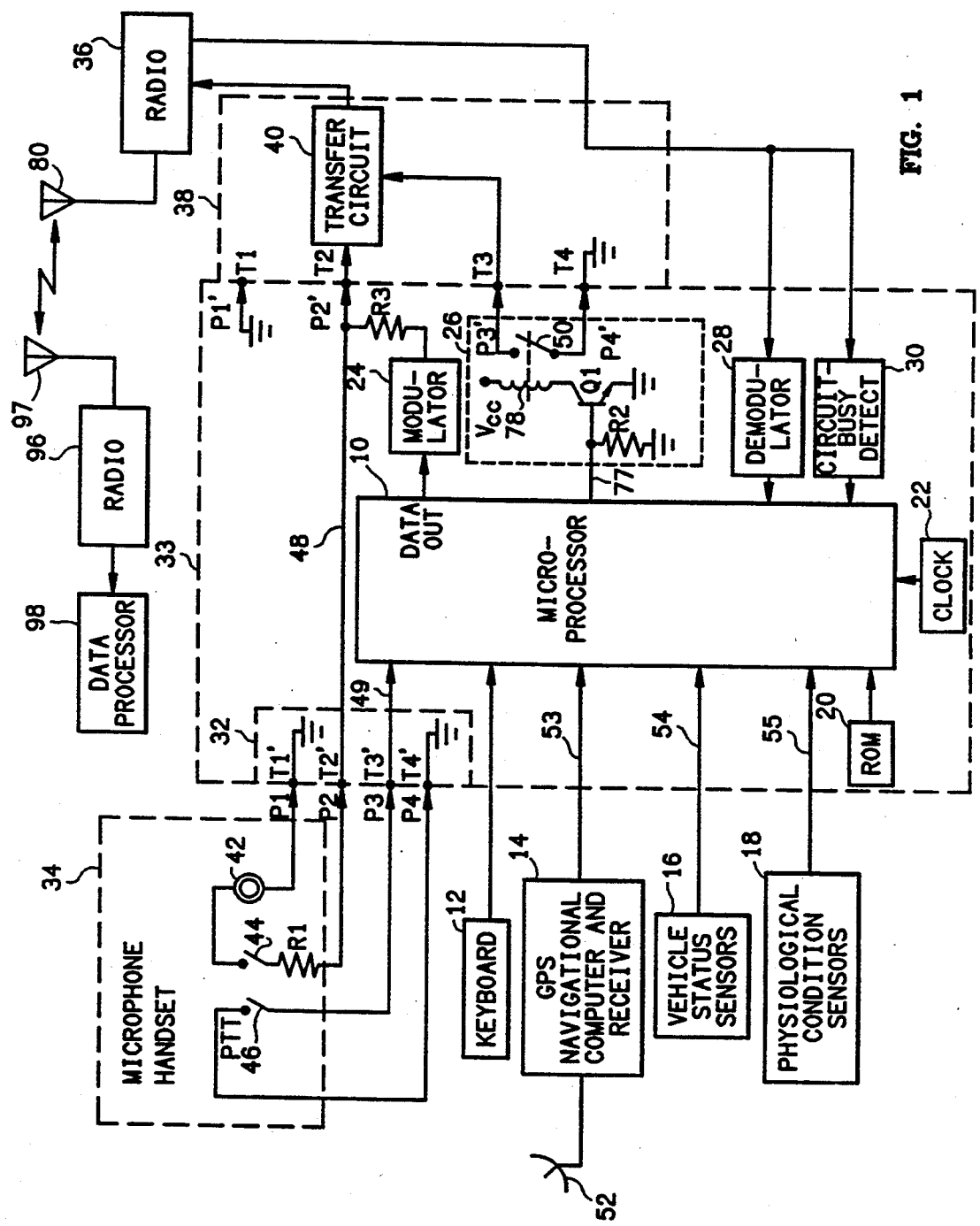

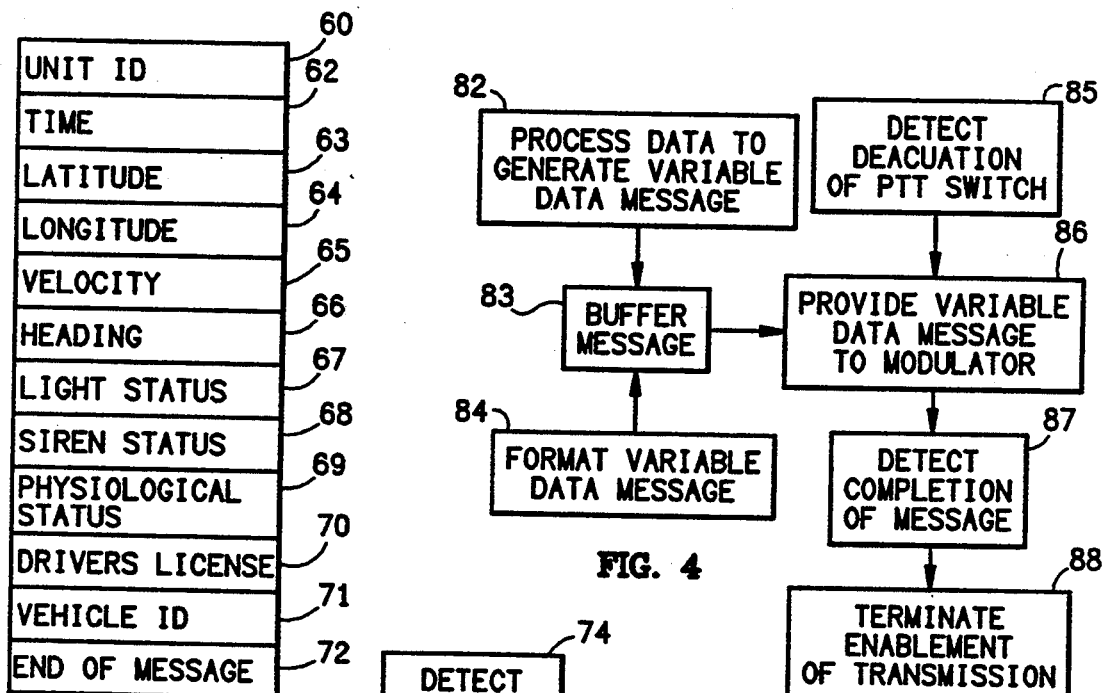

VARIABLE DATA MESSAGE COMMUNICATION OVER VOICE COMMUNICATION CHANNEL

BACKGROUND OF THE INVENTION

The present invention generally pertains to communications technology and is particularly directed to an improvement in transmitting variable data messages over voice communication channels.

Variable data messages are generated by processing variable data, i.e. data which varies from time to time, such as status data. In many instances variable data messages need be transmitted only infrequently, whereby they are transmitted over a voice communication channel when such channel is not being used for transmitting voice communication signals.

SUMMARY OF THE INVENTION

The present invention provides an apparatus that causes variable data messages to be automatically transmitted following transmission of voice signals over a given communication channel.

The communication apparatus of the present invention includes means for processing variable data to generate a variable data message; means responsive to operation of a switch for enabling transmission by a transmission means of the variable data message over a given communication channel, wherein the switch is a momentary switch and actuation of the momentary switch enables voice signal transmission by the transmitting means over the given communication channel during actuation of the momentary switch; means for detecting deactuation of the momentary switch; and means responsive to said detection of deactuation of the momentary switch for providing the variable data message to the transmitting means for transmission over the given communication channel.

Such automatic transmission of the variable data message is particularly advantageous in situations when there is an immediate need for the recipient of the voice signal to receive a variable status data message that is representative of the status of a system or a person located in common with the communication apparatus, and the person sending the voice signal is so occupied with the subject matter of the voice signal that he would be distracted from such subject matter by having to also actuate apparatus for transmitting the variable data message.

For example, when the transmitting means is a mobile radio located in a law enforcement patrol vehicle, there often is an immediate need for a dispatcher in receipt of a voice signal transmitted from the vehicle to know the location of the vehicle. In this example, the apparatus of the present invention uses Global Positioning System (GPS) technology to provide variable vehicle position data, generates a variable position data message indicative of the position of the vehicle and automatically provides the variable position data message for transmission to the recipient of the voice signal.

For another example, when the transmitting means is a mobile radio located in a vehicle, such as an aircraft, there often is an immediate need for a person in receipt of a voice signal transmitted from the vehicle to know a variable physiological status of the pilot. In this example, the apparatus of the present invention processes physiological data representative of one or more monitored physiological conditions, such as heart rate, of a person located in common with the apparatus, generates a variable physiological status data message indicative of a given physiological status, such as stress level, of said person and automatically provides the variable physiological status data message for transmission to the recipient of the voice signal.

Additional features of the present invention are described in relation to the detailed description of a preferred embodiments.

BRIEF DESCRIPTION OF THE DRAWING

FIG. 1 is a block diagram showing a preferred of the apparatus of the present invention coupled between a microphone handset and a radio.

FIG. 2 shows the format of a variable data message having both variable data components and fixed data components.

FIG. 3 is a flow diagram of functions performed by the microprocessor of the apparatus of FIG. 1 related to the transmission of voice signals.

FIG. 4 is a flow diagram of one preferred embodiment of the functions performed by the microprocessor the apparatus of FIG. 1 in relation to the generation and transmission of variable data messages.

FIG. 5 is a flow diagram of an alternative preferred embodiment of the functions performed by the microprocessor the apparatus of FIG. 1 in relation to the generation and transmission of variable data messages.

DETAILED DESCRIPTION

Referring to FIG. 1, a preferred embodiment of the apparatus of the present invention includes a microprocessor 10, a keyboard 12, a GPS navigational computer and receiver 14, vehicle status sensors 16, physiological condition sensors 18, a ROM (read only memory) 20, a clock 22, a modulator 24, a transmission control circuit 26, a demodulator 28, a circuit-busy-detect circuit 30 and a microphone interface circuit 32. The microprocessor 10, the ROM 20, the clock 22, the modulator 24, the transmission control circuit 26, the demodulator 28, the circuit-busy-detect circuit 30 and the microphone interface circuit 32 are contained in a common chassis 33.

The microphone interface circuit 32 is adapted for connection to a standard microphone handset 34.

A standard two-way radio 36 is connected to the apparatus of the present invention by a standard radio interface circuit 38 of the type used for interfacing a two-way radio to a microphone handset. The radio interface circuit 38 includes a transfer circuit 40 that enables the transfer of a voice signal from an input terminal T2 to the radio 36 for transmission over a given communication channel when the input terminal T3 is at ground potential. The input terminals T1 and T4 are internally connected to ground potential.

The microphone handset 34 includes a microphone 42, which is connected in series with a momentary-contact microphone switch 44 and a resistance R1 between a first output pin P1 and a second output pin P2. The microphone switch 44 is ganged with a push-to-talk (PTT) momentary-contact switch 46 for operation in common therewith. The PTT switch 46 is connected between a third output pin P3 and a fourth output pin P4.

In the absence of the apparatus of the present invention, when the microphone handset 34 is connected to the radio interface circuit 38 with output pins P1, P2, P3 and P4 of the microphone handset 34 respectively engaged with input terminals T1, T2, T3 and T4 of the radio interface circuit 38, actuation of the PTT switch 46 closes both the PTT switch 46 and the microphone switch 44, whereby a voice signal generated by speaking into the microphone 42 is provided to the input terminal T2 and whereby the input terminal T3 is connected through the closed PTT switch 46 to the grounded input terminal T4 to thereby enable the voice signal to be transferred from the Input terminal T2 to the radio 36.

The apparatus of the present invention is adapted to be coupled between the microphone handset 34 and the radio interface circuit 38 in such a manner so as to be transparent during transmission of voice signals while the momentary PTT switch 46 is being actuated.

The microphone interface circuit 32 includes input terminals T1', T2', T3' and T4' for respectively receiving the output pins P1, P2, P3 and P4 of the microphone handset 34. The input terminals T1' and T4' are connected to ground potential. The input terminal T2' is connected by a line 48 to an output pin P2' and the input terminal T3' is connected by a line 49 to an input terminal of the microprocessor 10. Another output pin P1' is connected to ground potential; and output pins P3' and P4' are connected on opposite sides of a relay switch 50 within the transmission control circuit 26. The output pins P1', P2', P3' and P4' are adapted for receipt by the input terminals T1, T2, T3 and T4 respectively of the radio interface circuit 38.

The operation of the microprocessor 10 is clocked by the clock 22.

The microprocessor 10 generates a variable data message in response to data received from the keyboard 12, the GPS navigational computer and receiver 14, the vehicle status sensors 16, and/or the physiological condition sensors 18.

The keyboard 12 is used both for entering data for processing by the microprocessor 10 and for controlling the operation of the microprocessor 10. Selection of the sources of input data to the microprocessor 10 is made by operation of the keyboard 12.

The GPS navigational computer and receiver 14 is coupled to a satellite signal receiving antenna 52 for receiving and processing variable GPS position data in accordance with GPS technology to determine the position of the apparatus and to generate a variable position data message indicative of the determined position on line 53 to a data input terminal of the microprocessor 10. GPS signals are regularly broadcast from a plurality of satellites that are continuously orbiting the Earth at one-half geosynchronous orbit. The GPS signals contain data that enable the position of a receiver receiving GPS signals from at least three different satellites to determine the position, speed and velocity of a vehicle containing the receiver. The variable position data message on line 53 includes indications of latitude, longitude, velocity and heading of the vehicle and the time at which such indicated data was computed by the GPS navigational computer and receiver 14. This feature is used when the apparatus is located in a vehicle, such as a law enforcement patrol car.

The vehicle status sensors 16 are also included when the apparatus is included in a vehicle. The vehicle status sensors 16 sense the status of such vehicle parameters as the on/off status of such vehicle components as a siren and a flashing light of a law enforcement patrol vehicle and provide data indicating such status on line 54, which is connected to a data input terminal of the microprocessor 10.

The physiological condition sensors 18 are attached to a person in the same vehicle as the apparatus, such as the pilot of an airplane, for monitoring one or more physiological conditions, such as heart rate and skin conductivity, of that person in order to provide physiological data representative of the monitored conditions. The physiological data is provided on line 55, which is connected to a data input terminal of the microprocessor 10. The microprocessor 10 processes the physiological data on line 55 to generate a variable physiological status data message component indicative of a given physiological status, such as stress level, of the person.

Through operation of the keyboard 12, such additional variable data as a driver's license number and a vehicle identification number may also be provided to the microprocessor 10 for inclusion in the variable data message.

The microprocessor 10 also processes data received from the radio 36 to generate variable data messages. Such data is provided to a data input terminal of the microprocessor 10 by the demodulator 28, which demodulates audio signals received from the radio 36 via the radio interface circuit 38. The circuit-busy-detect circuit 30 detects when a signal is being received by the radio 36 from other radios broadcasting over the given communication channel and prevents the microprocessor 10 from enabling transmission of signals from the microprocessor 10 to the radio 36 during such periods.

The variable data message generated by the microprocessor may also include some fixed components, such as the unit identification (ID) number associated with the apparatus. The unit ID number is provided to the microprocessor 10 from the ROM 20.

Referring the FIG. 2, the variable data message generated by the microprocessor 10 includes the unit ID number 60, the time 62, and one or more of such variable data components as latitude 63, longitude 64, velocity 65, heading 66, siren status 67, flashing light status 68, physiological status 69, driver's license number 70, vehicle ID number 71 and an end-of-message tag 72.

The operation of the microprocessor 10 in providing the voice signal and the variable data message to the radio 36 Is described with reference to FIGS. 3, 4 and 5.

Referring to FIGS. 1 and 3, when the PTT switch 46 is actuated so that a person can generate a voice signal on line 48 by speaking into the microphone 42, the microprocessor 10 detects such actuation by reason of the signal on line 49 to the microprocessor 10 being drawn to ground potential by closure of the PTT switch 46. In response to detection of actuation of the PTT switch 46, as indicated by block 74 in FIG. 3, the microprocessor 10 enables transmission of signals by the radio 36 over the given communication channel, as indicated by block 75. The microprocessor 10 enables transmission of signals by the radio 36 over the given communication channel by changing the state of a control signal provided by the microprocessor 10 on line 77 to the transmission control circuit 26. The transmission control circuit 26 includes a relay coil 78 that is connected in series between a voltage source $V_{CC}$ and ground potential by an npn transistor Q1 that is switched into a conductive state by the control signal on line 77 changing to a positive state. When the transistor Q1 is switched into a conductive state, the relay coil 78 is energized to close the relay switch 50 and thereby connect the terminal T3 of the radio interface circuit 38 to ground potential, which in turn causes the transfer circuit 40 to enable a voice signal on line 48 to be transferred via the input terminal T2 to the radio 36 for transmission over the given communication channel via an antenna 80 connected to the radio 36.

Referring to FIGS. 1 and 4, the microprocessor 10 continuously processes data to generate the variable data message, as indicated by block 82 in FIG. 4, and buffers an updated variable data message for later transmission, as indicated by block 83. The variable data message is formatted, as indicated by block 84, in accordance with the selection of the components of the variable data message made by operation of the keyboard 12. When the PTT switch 46 is deactuated so that a person can no longer generate a voice signal on line 48 by speaking into the microphone 42, the microprocessor 10 detects such deactuation, as indicated by block 85 in FIG. 4, by reason of the signal on line 49 to the microprocessor 10 changing from ground potential as a result of the PTT switch 46 being opened. In response to detection of deactuation of the PTT switch 46, the microprocessor 10 provides the buffered variable data message from a data output terminal of the microprocessor 10 to the modulator 24, as indicated by block 86. The modulator 24 modulates the variable data message for transmission and provides the modulated data message to the radio 36 via a resistance R3, the line 48, input terminal T2 of the radio interface circuit 38 and the transfer circuit 40 for transmission over the given communication channel via the antenna 80. When the microprocessor 10 detects deactuation of the PTT switch 46, the microprocessor 10 does not change the state of the control signal on line 77, and as a result the transfer circuit 40 continues to enable the transfer of signals from the input terminal T2 to the radio 36 for transmission over the given communication channel.

However, the microprocessor 10 does detect completion of provision of the variable data message to the radio 36 by detecting the end-of-message tag 72 in the message, as indicated by block 87 of FIG. 4, and responds to said detection of completion of provision of the variable data message to the radio 36 by changing the state of the control signal on line 77, which in turn results in the relay switch 50 being opened to thereby terminate enablement of transmission of signals from the input terminal T2 over the given communication channel by radio 36, as indicated by block 88.

In an alternative preferred embodiment, as described with reference to FIGS. 1 and 5, the microprocessor 10 continuously processes data to generate the variable data message, as indicated by block 82 in FIG. 5, and buffers an updated variable data message for later transmission, as indicated by block 83. The variable data message is formatted, as indicated by block 84, in accordance with the selection of the components of the variable data message made by operation of the keyboard 12, as indicated by block 90. Upon the selection of the components of the variable data message being made, the microprocessor 10 determines the duration required for transmitting the variable data message in accordance with the respective durations of the selected components of the formatted variable data message, as indicated by block 92.

When the PTT switch 46 is deactuated, the microprocessor 10 detects such deactuation, as indicated by block 85 in FIG. 5 and as described above with reference to FIGS. 1 and 4. In response to detection of deactuation of the PTT switch 46, the microprocessor 10 provides the buffered variable data message to the modulator 24, as indicated by block 86; and the modulator 24 modulates the variable data message and provides the modulated data message to the radio 36 for transmission over the given communication channel via the antenna 80, as described above with reference to FIGS. 1 and 4. As in the embodiment described above with reference to FIGS. 1 and 4, the microprocessor 10 does not change the state of the control signal on line 77 in response to deactuation of the PTT switch 46, and as a result the transfer circuit 40 continues to enable the transfer of signals from the input terminal T2 to the radio 36 for transmission over the given communication channel.

However, the microprocessor 10 does respond to detection of deactuation of the PTT switch 46 by measuring the duration following detection of deactuation of the PTT switch 46, and by changing the state of the control signal on line 77 upon passage of the determined duration after detecting deactuation, which in turn results in the relay switch 50 being opened to thereby terminate enablement of transmission of signals from the input terminal T2 over the given communication channel by radio 36, as indicated by block 94.

The apparatus of the present invention is included in a communication system with a second two-way radio 96 and a data processor 98. The radio 96 receives the transmitted voice signal and the transmitted variable data message via an antenna 97; and the data processor 98 processes the received variable data message.

I claim:

1. A communication system comprising an apparatus for generating and enabling transmission of variable data messages, wherein the apparatus includes:

means for connecting a microphone handset having a momentary switch for enabling generation of a voice signal to a transmitting means interface circuit that enables transfer of the voice signal from the microphone handset to a transmitting means;

processing means;

means for connecting the processing means to a variable data source that is independent and separate from both the communication system and the microphone handset;

wherein the processing means process variable data from said variable data source to generate a variable data message;

circuit means for enabling transmission by said transmitting means of the voice signal over a given communication channel during actuation of the momentary switch when the apparatus is connected between said microphone handset and said transmitting means interface circuit;

means for detecting deactuation of the momentary switch when the apparatus is connected between said microphone handset and said transmitting means interface circuit; and means coupled to the detecting means for causing the variable data message to be provided to the transmitting means for transmission over the given communication channel in response to detection of deactuation of the momentary switch by the detection means when the apparatus connects said microphone handset to said transmitting means interface circuit;

wherein when the apparatus connects said microphone handset to said transmitting means interface circuit the apparatus is transparent during transmission of voice signals while the momentary switch is being actuated.

2. A communication system according to claim 1, further comprising receiving apparatus for receiving said transmitted voice signal and said transmitted variable data message; and processing apparatus for processing said received variable data message.

3. A communication system comprising an apparatus for generating and enabling transmission of variable data messages indicative of a status of a separate system or a person located in common with the apparatus, wherein the apparatus includes:

means for connecting a voice signal source having a momentary switch for enabling generation of a voice signal to a transmitting means;

processing means;

means for connecting the processing means to a variable data source that is independent and separate from both the communication system and the voice signal source;

wherein the processing means process variable data from said variable data source to determine a status of said separate system or said person located in common with the apparatus and to generate a variable status data message indicative of said determined status;

circuit means for enabling transmission by said transmitting means of the voice signal over a given communication channel during actuation of the momentary switch when the apparatus is connected between said voice signal source and said transmitting means;

means for detecting deactuation of the momentary switch when the apparatus is connected between said voice signal source and said transmitting means; and means coupled to the detecting means for causing the variable data message to be provided to said transmitting means for transmission over the given communication channel in response to detection of deactuation of the momentary switch by the detection means when the apparatus connects said voice signal source to said transmitting means.

4. A communication system according to claim 3, further comprising receiving apparatus for receiving said transmitted voice signal and said transmitted variable status data message; and processing apparatus for processing said received variable status data message.

5. A communication system according to claim 3, wherein said variable data source is a variable position data source and the processing means include means for processing variable position data from said variable data source to determine a variable position of said separate system or said person located in common with the apparatus and to generate a variable position data message indicative of said determined position for transmission over the given communication signal as the variable status data message.

6. A communication system according to claim 5, further comprising receiving apparatus for receiving said transmitted voice signal and said transmitted variable position data message; and processing apparatus for processing said received variable position data message.

7. A communication system according to claim 3, wherein said variable data source is a source of variable physiological data representative of one or more monitored physiological conditions of said person located in common with the apparatus and the processing means include means for processing variable physiological condition data from said variable physiological data source to generate a variable physiological status data message indicative of a physiological status of said person for transmission over the given communication signal as the variable status data message.

8. A communication system according to claim 7, further comprising means for monitoring one or more physiological conditions of a person located in common with the apparatus to provide said physiological data representative of the monitored conditions.

9. A communication system according to claim 7, further comprising receiving apparatus for receiving said transmitted voice signal and said transmitted variable physiological status data message; and processing apparatus for processing said received variable physiological status data message.

* * * * *